March 19, 1940.  J. AUER  2,194,192
EYESHIELD
Filed Feb. 18, 1939  2 Sheets-Sheet 1

INVENTOR
John Auer
BY William Heyrer
ATTORNEY

March 19, 1940.  J. AUER  2,194,192
EYESHIELD
Filed Feb. 18, 1939  2 Sheets-Sheet 2
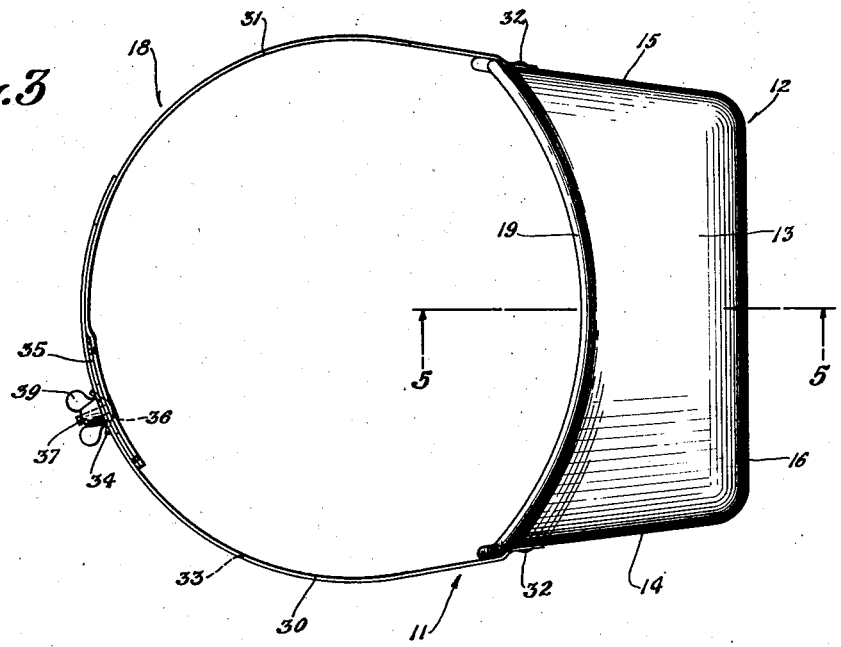
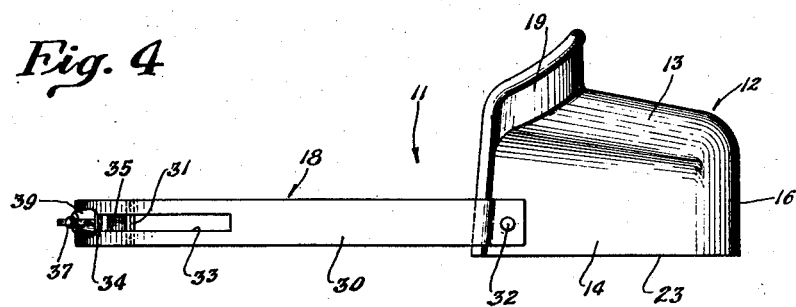
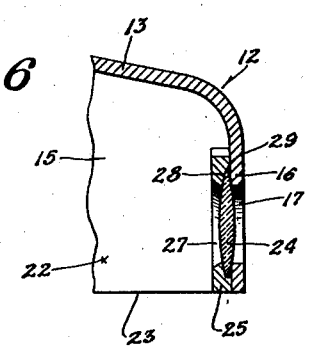
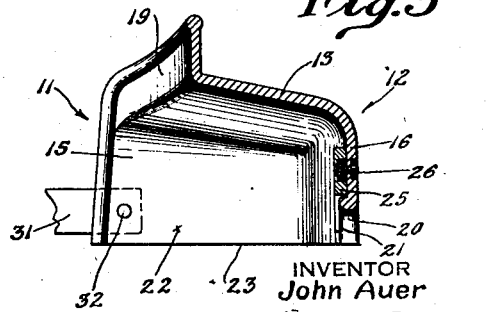
INVENTOR
John Auer
BY William F. Heyrer
ATTORNEY Patented Mar. 19, 1940

2,194,192

UNITED STATES PATENT OFFICE 2,194,192

EYESHIELD

John Auer, Norwalk, Conn.

Application February 18, 1939, Serial No. 257,063

3 Claims. (Cl. 2—14)

This invention relates to an improved eyeshield.

It is an object of the invention to provide an eyeshield which may be most economically produced and which is adapted to serve not only as a shield against light but also as a lens support.

It is a further object of the invention to provide a device which shields the eyes in a more effective manner than those devices heretofore devised.

It is another object of the invention to provide an eyeshield which is adapted to be supported in such a way that it will be maintained against being inadvertently knocked out of position on the head of the wearer.

In the attainment of these and other objects there is provided as a feature of the invention a device which when associated with the head of a wearer provides a chamber in front of the eyes, completely enclosed except for an open bottom, and having a means adapted to support and locate the device on the nose of the wearer.

Another feature of the invention resides in the provision of a one-piece molded eyeshield, having a top wall, side walls, a depending front wall and an open bottom, with the top wall having a means for engaging the forehead of the wearer and with a flange defined recess in the front wall adapted to receive and support the shield upon the wearer's nose.

Another feature of the invention resides in the provision of a device for supporting a lens, such as a magnifying lens at a point spaced forwardly from the eye of an individual, the device when associated with the head of an individual providing a chamber completely enclosed except for an open bottom and adapted to support a lens in an aperture formed in a depending front wall which is also formed with a recess adapted to receive the nose and thereby locate the lens relative to the eyes.

Other objects and features will hereinafter appear.

In the drawings:

Fig. 3 is a top view of the device shown in Fig. 1.

Fig. 4 is a side view of the device.

Fig. 5 is a sectional view, taken on the line 5—5 of Fig. 3.

Fig. 6 is a fragmentary sectional view taken on the line 6—6 of Fig. 2.

Figure 1:
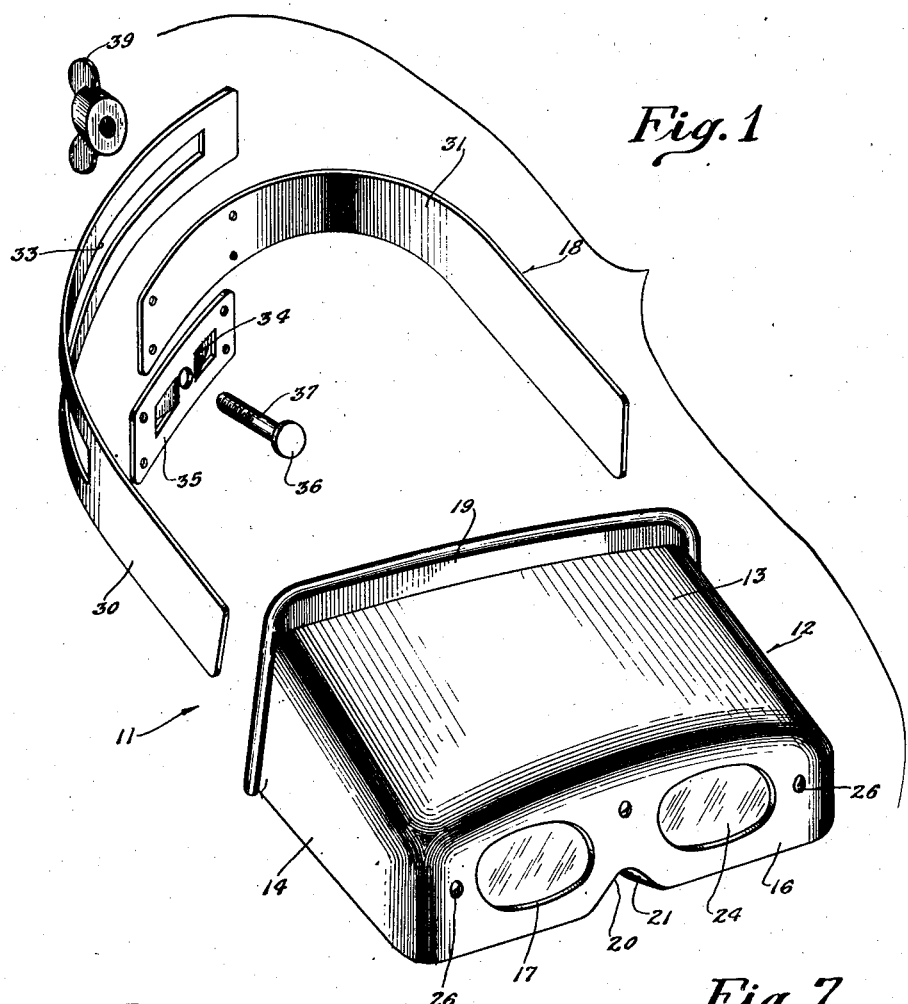
Figure 1 is an exploded perspective view of a device embodying the invention.
Figure 2:
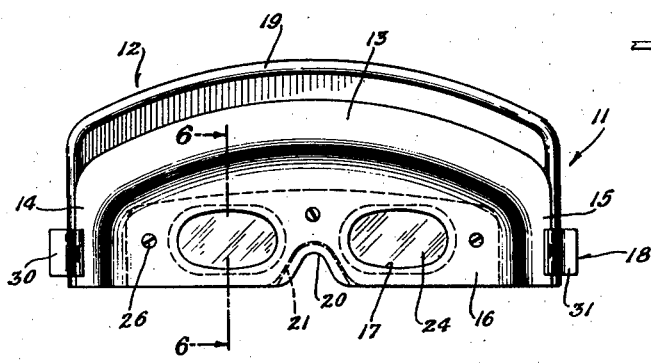
Fig. 2 is a front view of the device shown in Fig. 1.
Figure 7:
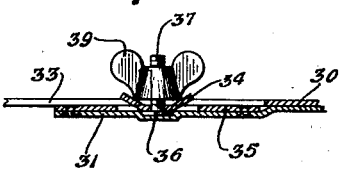
Fig. 7 is a detail view of the head band size adjusting means.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring more particularly to the drawings there is shown a novel eyeshield device 11 embodying the invention. As shown, it includes a main shell 12 having a top wall 13, side walls 14 and 15 and a depending front wall 16 with a pair of eye openings 17 therein. A head encircling band 18 may be secured to the side walls 14 and 15 as a means for associating the device with the head of an individual.

The top wall 13 preferably is provided with a flange 19 shaped to engage the forehead, and serves to space the depending front wall 16 outwardly from the eyes and face of a wearer. A substantially V-shaped recess 20 in the lower edge of the front wall 16 and defined by a flange 21 is adapted to receive the nose to thereby partially support the device 11 and properly locate the device and the openings 17 transversely relative to the eyes. When the device 11 is associated with the wearer's head it is thus seen that the main shell 12 defines a light shielded chamber 22 which is completely enclosed except for an open bottom 23.

Preferably and as shown the main shell 12 is of a one-piece construction and may be advantageously formed of a suitable moldable material, such for example as a composition of caoutchouc or "Bakelite". Such a shell may be most easily and economically produced by molding in a suitably shaped press.

Of importance, it is to be noted that while the shell provides a most effective shield for the eyes, the front wall 16 is spaced from the head so that conventional eye glasses may be worn without interference from the shield. Also, while the side walls 14 and 15 extend rearwardly to a point where they are adapted to closely overlie the sides of the head and thus most effectively shield the eyes, the open bottom 23 permits the wearer, by looking downwardly, to have a clear vision uninterrupted by the walls of the main shell.

This latter consideration is of particular importance when, as in the illustrated form, magnifying lenses 24 are associated with the openings 17. Thus a person without removing the shell or moving it in any way may look at the subject through the magnifying lens and then by lowering his eyes and shifting the position of his head may look directly at the same subject through the open bottom.

This feature of the device renders the same particularly adapted for use by a toolmaker or other worker who performs very fine work and must often use a magnifying lens. With the device forming the subject matter of the present invention the lenses 24 are always in a position where they may be used and the hands of the worker are always free. There is no problem of picking up and putting down the lens, and of importance, the shell 12 not only provides a support for the lens but also provides a light-shielded chamber 22 which most effectively shields the eyes from undesired direct glare and prevents the light from striking the back of the lens and being adversely reflected into the eyes.

While magnifying lenses are illustrated as positioned to close the openings, it is to be understood that plain lenses may be positioned in the openings, as for example colored or tinted lenses of the type now used in conventional sunglasses. When such plain lenses are used the device is particularly adapted for use under conditions where a strong light is encountered, as for example by automobile drivers, by sun bathers, and by persons doing close work where a brilliant light is needed.

For mounting lenses in the openings, be the lens plain or magnifying, there may be advantageously provided, as shown, a mounting plate 25 which may be formed of moldable material such as is preferably utilized in forming the main shell 12. This mounting plate 25 is fixed to the inner face of the depending front wall 16, as by screws 26, and is provided with a pair of openings 27 alined with the openings 17 in the front wall and formed with forwardly facing shoulders 28 defining enlarged sockets 29 for receiving the lenses. It is thus seen that the lenses are securely held between the shoulders 28 and the inner face of the front wall 16 in such a way that should it be desired to replace either one or both of the lenses, or to use the device without any lens, it is merely necessary to loosen the screws 26 and remove the mounting or supporting plate 25.

Preferably, and as shown, the head band 18 is formed in two sections 30 and 31 of any suitable flexible material, respectively connected as by rivets 32, to the side walls 14 and 15 of the main shell, and provided with means adjacent their free ends whereby the band may be adjusted to divers sizes. Thus, one of the sections 30 is formed with a slot 33 extending longitudinally thereof into which spring fingers 34 on the other section 31 are adapted to extend and thereby locate the two sections relative to each other. These spring fingers 34 may advantageously be formed by lancing out portions of a relatively thin metal strip 35 fixed to the band section 31 and adapted to secure a headed screw element 36 to the section 31 with the threaded shank 37 thereof extending through an aperture 38 in the metal strip and thence outwardly through the slot 33 in the other section 30.

With this construction the head band can be readily adjusted to any desired size by shifting the free ends of the band sections 30 and 31 relative to each other, and may be fixed in a selected size by a wing nut 39 which screws on the shank 37 and draws the overlapping portions of the sections tightly together. Of importance it is to be noted that the spring fingers 34 serve not only as a guide for locating one of band sections relative to the other but also as a means for engaging the underside of the wing nut 39 and thus maintaining the same against inadvertent unscrewing.

It is thus seen that the novel device provided by the present invention not only may be most easily and economically produced, as by molding the one-piece integral shell, but also is adapted to serve most effectively as a means for shielding the eyes and for locating and supporting lenses in line with and at a point spaced from the eyes so that there need be no interference with any regular spectacles which the user may be wearing. Also, because of the relatively large chamber 22 with an open bottom 23, provided by the shell, sufficient space is provided for the circulation of air so that the device may be worn comfortably even though the surrounding temperature be high.

While the term lens, which sometimes has a limited and technical meaning, has been used in describing the light transmitting closures for the eye openings 17 in the shell 12, it is to be understood that unless specific reference is made to the contrary, this term is intended to cover any means adapted to close an eye opening and through which a person may distinguish objects.

Variations and modifications may be made within the scope of this invention and portions of the improvements may be used without others.

Having thus described the invention, what is claimed as new is:

1. In a device of the character described for association with the head of an individual, the combination of an inflexible eyeshield having an outwardly extending top portion; means on said top portion for engaging the forehead of an individual; depending side portions at opposite sides of said top portion, adapted to embrace the sides of an individual's head; a depending front portion at the front of said top portion and spaced outwardly thereby from said forehead engaging means having light-transmitting apertures, said top, side and front portions providing an eyeshield which when associated with the head of an individual has an open bottom; means on said front portion shaped to receive and rest on the nose of an individual; and a head band for holding the device in place.

2. In a device of the character described for association with the head of an individual, the combination of means for engaging the forehead of an individual; means for resting on the nose of an individual; inflexible eyeshield means connecting said first two named means and having an open bottom; a depending front section on said eyeshield having at least one eye opening therein; and a supporting plate associated with said front section and having an opening with a contiguous socket, said socket being adapted to receive a light transmitting closure for said eye opening and to position the same between said supporting plate and said front section.

3. In a device of the character described for association with the head of an individual, the combination of an eyeshield and supporting member of flexible material having top, side and front walls and an open bottom, said front wall depending from said top wall and having at least one eye opening therein, and said side walls being adapted to embrace the sides of the head; inwardly extending flanged means on said front wall for engaging the nose of and supporting said eye opening relative to an eye of an individual; and means for releasably supporting a light transmitting closure means relative to said eye opening.

JOHN AUER.

CERTIFICATE OF CORRECTION.

Patent No. 2,194,192. March 19, 1940.

JOHN AUER.

It is hereby certified that error appears in the printed specification of the above numbered patent requiring correction as follows: Page 2, second column, line 61, claim 3, for "flexible" read inflexible; and that the said Letters Patent should be read with this correction therein that the same may conform to the record of the case in the Patent Office.

Signed and sealed this 16th day of April, A. D. 1940.

(Seal)

Leslie Frazer
Acting Commissioner of Patents.